United States Patent [19]

Richardson, Jr. et al.

[11] Patent Number: 5,317,627
[45] Date of Patent: * May 31, 1994

[54] ENHANCED WIDE AREA AUDIO RESPONSE NETWORK

[75] Inventors: Charles T. Richardson, Jr., Gwinnett County; Kevin L. Austin, Fulton County, both of Ga.

[73] Assignee: United States Advanced Network, Inc., Norcross, Ga.

[ * ] Notice: The portion of the term of this patent subsequent to May 12, 2009 has been disclaimed.

[21] Appl. No.: 852,491

[22] Filed: Mar. 16, 1992

Related U.S. Application Data

[63] Continuation of Ser. No. 591,047, Oct. 1, 1990, Pat. No. 5,113,430.

[51] Int. Cl.$^5$ .................. H04M 1/64; H04M 11/00
[52] U.S. Cl. ......................... 379/88; 379/67; 379/94; 379/207; 379/244; 370/60
[58] Field of Search .................. 379/88, 89, 67, 244, 379/207, 94, 97; 370/94.1, 94.2, 110.1, 62, 60, 60.1, 61

[56] References Cited

U.S. PATENT DOCUMENTS

| D. 461,094 | 9/1986 | Asmuth et al. ............ 179/7.1 |
| 3,728,486 | 4/1973 | Kraus .................. 379/69 |
| 4,071,698 | 1/1978 | Barger, Jr. et al. ........... 379/91 |

(List continued on next page.)

OTHER PUBLICATIONS

Customer Control of Network Services—G. A. Raack, E. G. Sable, R. J. Stewart, Oct. 1984—vol. 22 No. 10—pp. 8-14.
AT&T's Conversant I Voice System—John P. Moosemiller—Mar./Apr. 1986 Speech Technology—pp. 88-93.
Conversant I Voice System: Architecture And Applications—Robert J. Perdue and Eugene L. Rissanen—Sep./Oct. 1986—AT&T Tech. Journal—pp. 34-47.
David S. Cheeseman, Martin B. Cooper—Radion and Electronic Engineer—vol. 53 (1983) Voke Signalling in the Telephone Network—pp. 142-247.
Second IEE National Conference on Telecommunications—P. P. Cretch, A. R. Allwood, E. S. P. Allard, A Network for Recorded Distribution—Apr. 1989, pp. 10-14.
David R. Fischell, Sarbmeet S. Kanwal, Daniel Furman—Interactive Voice Technology Applications—AT&T Technical Journal Sep./Oct. 1990—pp. 61-76.

*Primary Examiner*—James L. Dwyer
*Assistant Examiner*—Fan Tsang
*Attorney, Agent, or Firm*—Louis T. Isaf

[57] ABSTRACT

Apparatus and method to provide enhanced wide area audio response services through an enhanced wide area audio response network which includes a central controller and a plurality of audio peripherals distributed over a wide area, each audio peripheral being connected to telephone lines for receiving and originating telephone calls, converting received analog audio signals into digital representations, recording and storing digital representations, converting stored digital representations into analog audio signals, playing audio signals over connected telephone lines, and communicating with, including receiving commands from, the central controller over a Packet Switched Public Data Network (PSPDN), which controller is a highly reliable general purpose controller which offers utility grade service to each audio peripheral and utilizes Dialed Number Identification Service (DNIS) tables for various applications, including voice messaging, audio text, remote information provider accessing, and testing to provide error notification.

8 Claims, 9 Drawing Sheets

U.S. PATENT DOCUMENTS

| | | | |
|---|---|---|---|
| 4,188,507 | 2/1980 | Meri et al. | 379/77 |
| 4,229,624 | 10/1980 | Haben et al. | 379/272 |
| 4,255,619 | 3/1981 | Saito | 379/96 |
| 4,320,256 | 3/1982 | Freeman | 179/6.04 |
| 4,371,752 | 2/1983 | Matthews et al. | 379/88 |
| 4,489,438 | 12/1984 | Hughes | 381/51 |
| 4,577,062 | 3/1986 | Hilleary et al. | 179/2 |
| 4,598,367 | 7/1986 | DeFrancesco et al. | 364/408 |
| 4,640,991 | 2/1987 | Matthews et al. | 379/84 |
| 4,649,563 | 3/1987 | Riskin | 379/97 |
| 4,663,777 | 5/1987 | Szeto | 379/88 |
| 4,716,583 | 12/1987 | Groner et al. | 379/88 |
| 4,757,261 | 7/1988 | Riskin | 379/201 |
| 4,757,267 | 7/1988 | Riskin | 379/201 |
| 4,766,604 | 8/1988 | Axberg | 379/67 |
| 4,788,718 | 11/1988 | McNabb et al. | 379/113 |
| 4,792,968 | 12/1988 | Katz | 379/92 |
| 4,811,382 | 3/1989 | Sleevi | 379/67 |
| 4,817,130 | 3/1989 | Frimmel, Jr. | 379/88 |
| 4,827,500 | 5/1989 | Binkard et al. | 379/88 |
| 4,829,514 | 5/1989 | Frimmel, Jr. et al. | 370/58 |
| 4,845,739 | 7/1989 | Katz | 379/92 |
| 4,899,375 | 2/1990 | Bauer et al. | 379/264 |
| 4,901,341 | 2/1990 | Carter et al. | 379/89 |
| 4,908,850 | 3/1990 | Masson et al. | 379/89 |
| 4,922,519 | 5/1990 | Daudelin | 379/67 |
| 4,922,520 | 5/1990 | Bernard et al. | 379/88 |
| 4,930,150 | 5/1990 | Katz | 379/93 |
| 4,933,966 | 6/1990 | Hird et al. | 379/132 |
| 4,933,967 | 6/1990 | Lo et al. | 379/207 |
| 4,935,956 | 6/1990 | Hellwarth et al. | 379/112 |
| 4,947,422 | 8/1990 | Smith et al. | 379/200 |
| 4,954,958 | 9/1990 | Savage et al. | 379/207 |
| 4,972,461 | 11/1990 | Brown et al. | 379/67 |
| 5,003,534 | 3/1991 | Gerhardt et al. | 379/94.1 |
| 5,014,303 | 5/1991 | Velius | 379/201 |
| 5,023,868 | 6/1991 | Davidson et al. | 379/88 |
| 5,048,075 | 9/1991 | Katz | 379/92 |
| 5,255,309 | 10/1992 | Katz | 379/88 |

ENHANCED WIDE AREA AUDIO RESPONSE NETWORK

This application is a continuation of application Ser. No. 07/591,047, filed on Oct. 10, 1990, now U.S. Pat. No. 5,113,430.

FIELD OF THE INVENTION

The present invention relates generally to the field of audio response systems, and more specifically to the field of providing enhanced audio response services over a wide area network.

BACKGROUND OF THE INVENTION

Audio response systems have been used in businesses for many years to replace costly human operators. Generally speaking, audio response systems include such systems as Audio Text, Interactive Voice Response (IVR), Voice Mail, and Voice Messaging. Audio Text generally refers to a service in which a caller dials a telephone number from a telephone station to receive audio information simply as a result of making the call. Examples of this service include time and temperature recordings.

Interactive Voice Response systems (IVR's) generally incorporate caller interaction with the service. These systems have been utilized very effectively in businesses which typically utilize labor to perform "rote" or repetitive informational, customer service tasks. IVR's normally solicit caller responses by providing audio menus to callers. The audio menus are frequently canned messages of digitized voice prompts. The callers respond to the audio menus by pressing one or more of the Dual Tone Multi-Frequency (DTMF) keys on their telephone keypads. In this way, the callers and the IVR's "interact".

IVR's are used in many different applications, including telephone banking, order entry, and automatic call routing. IVR's often enable telephones to serve as "terminals" to host computers. Live operators are often incorporated to assist callers using rotary phones and callers who refuse to interact with machines. One example of an IVR is disclosed in U.S. Pat. No. 4,908,850. That patent shows a local network of independent IVR's which work in conjunction with live operators. IVR's are typically connected to Private Branch Exchanges (PBX's) or exist as stand alone systems in single locations.

Voice Mail Systems and Voice Messaging Systems are very similar to each other and are also very well-known. Both of these systems often incorporate many IVR functions. Typically, these systems are used to record messages which will be re-played to intended recipients at later times. The messages are very often digitized and subsequently stored on digital storage media.

Voice Mail Systems are functionally similar to common answering machines. A caller is typically transferred to the Voice Mail System when the intended recipient is not available. A digitized message, often in the recipient's voice, requests the caller to leave a message. The system then typically records the caller's message by storing a digital representation of the message. The system then provides an indication on the recipient's telephone, i.e., a Message Waiting light, to notify the recipient that a message is waiting to be retrieved. The recipient then accesses the system and listens to a re-play of the message. The system normally provides several options to the recipient, including re-playing, deleting, and saving the message.

Voice Messaging Systems also involve leaving messages for intended recipients. However, these systems are normally accessed by callers who wish to record messages to be sent to recipients at future times. A common system number is dialed, and the intended recipient's number is entered along with the message. The system later calls the intended recipient and re-plays the recorded message. One example of a Voice Messaging System is disclosed in U.S. Pat. No. 4,371,752. That patent also discloses functions typically found in Voice Mail Systems. Voice Mail Systems and Voice Messaging Systems are also typically connected to PBX's or exist as stand alone systems in single locations.

A system which offers audio response services to a wide area, for example, the United States, can either be a stand alone or a distributed system. A stand alone system often suffers the typical disadvantages of long distance communication, including signal degradation, propagation delay, and cost. Many wide area audio response systems include 800 number access, a service provided by Long Distance Carriers (LDC's) and typically referred to as INWATS ("IN" designates that the call is directed to the owner of the number and "WATS" is an acronym for Wide Area Telephone Service) which allows callers to make long distance calls which are paid for by the recipient of the call rather than by the caller. The service is typically billed on a time or time-distance basis.

Alternately, distributed systems often have other disadvantages. U.S. Pat. No. 4,757,267 discloses a wide area system for routing calls to suppliers of goods. In that patent, locally controlled IVR's process caller specific information and access a remote database for supplier telephone numbers. The system disclosed in that patent is relatively costly to implement due to the required number of intelligent IVR'S. This high start-up cost reduces the system's effectiveness as a substitute for human operators. Because identical call control programs are stored independently on each and every IVR, programming changes appear to be very time consuming and inefficient, possibly requiring a break in availability.

A need exists in the industry for a wide area audio response system which is uniquely designed to be both economical and efficient. Specifically, a system is needed which minimizes signal degradation, propagation delay, and cost, while providing for convenient programming changes and non-interruptible service.

BRIEF SUMMARY OF THE INVENTION

Briefly described, the object of this invention is to provide an enhanced wide area audio response network which satisfies the above stated needs. The present invention offers audio response services through a unique wide area network of Audio Response Nodes (ARN's) which are controlled by an Audio Response Node (ARN) manager. The system is potentially capable of offering a wide range of audio response services to a large number of users efficiently and cost effectively.

Each ARN, frequently located in a Long Distance Carrier's (LDC's) Point of Presence (POP) within a Local Access & Transport Area (LATA), is connected to an LDC switch and appears to the switch, in many respects, as another switch. Two channel banks in each ARN typically split T1 digital lines from the LDC switch into 4-wire Ear & Moutti (E&M) analog lines. Two Audio Response Units (ARU's) and switches are also included in each ARN. A telephone interface in each ARU is capable of detecting and producing Multi-Frequency (MF), Dual Tone Multi-Frequency (DTMF), and E&M control signals. The telephone interface can also be used in conjunction with the switch to connect callers with remote live operators.

Each ARN communicates with the ARN manager through a network. The preferred network is the Packet Switched Public Data Network (PSPDN) using the X.25 protocol. Alternately, other networks including conventional leased lines are also acceptable. Packet Assembler/Disassembler (PAD's) are connected to each ARU because they are not capable of operating in the packet mode, unlike the ARN manager which is capable of operating in the packet mode. Data Circuit-terminating Equipment (DCE), often iii the form of MODEM's (MODulator/DEModulator), is used to connect the PAD's and the ARN manager to the PSPDN.

In addition to the telephone interface and switch, each ARU contains digital storage media on which digital representations of analog audio signals are contained. These analog audio signals can include IVR prompts, volatile Audio Text information, or messages for Voice Messaging applications. Also included is a processor with enough intelligence to interpret commands received from the ARN manager. The ARU is often referred to as a peripheral, indicating its dependence on an additional controlling device. Because the intelligence levels of the ARN's are low, the corresponding costs of the ARN's are therefore lower than independent IVR's or similar ARN's with greater intelligence. Also, the transmission costs of data communication between the ARN manager and the ARN's are much lower than the high transmission costs of audio signals normally associated with stand alone systems. The concentration of intelligence and distribution of audio storage of the present invention constitutes a unique balance.

The ARN manager is a highly reliable and continuously available, fault tolerant, and redundant general purpose controller which offers utility grade service to each ARN and is capable of processing a very large number of calls at many different ARN's simultaneously. All of the call control programs (scripts) are located in the ARN manager and contain, among other elements, ARN commands. Caller information, such as the number dialed by the caller, is used to determine which script should be run by the ARN manager for each caller. This information is normally provided through conventional Dialed Number Identification Service (DNIS). Because scripts are contained in only one location, the ARN manager, programming changes can be handled efficiently and cost effectively. Through a table selection process, programming changes are prevented from affecting the availability of tile system.

The ARN manager is also capable of interfacing with remote information provider databases through various network links, including the PSPDN, leased lines, and switched lines, using any of a variety of communication protocols, including X.25, 3270, LU2, LU6.2, Asynchronous, and Bisynchronous. The system is therefore able to simultaneously provide many telephone callers with interfaces to various remote databases. In this way, the system can provide access to many diverse services as a result of dialing one telephone number.

Many back-end services are also provided by the ARN manager, including billing, testing, error detection, and error notification procedures. Transaction files are kept for every caller and are formatted into appropriate billing formats. Testing procedures include originating and receiving testing information over each connected user telephone line. Error detection and notification includes interpreting various error signals and subsequently notifying appropriate service personnel. An Audio Response Unit (ARU), similar to ARU's utilized in the ARN'S, is co-located with the ARN manager and provides the means by which audio messages, varying with the type of error detected, can be delivered to support personnel over a telephone at the time of the error. Similarly, a paging service can be accessed to provide service personnel with error identification information.

A wide variety of services can be provided by the present invention. One service offered by the present invention is voice messaging. In one embodiment, callers from public pay telephones access the system by calling 800 numbers. One identical 800 number may be used for the entire nationwide system, in which case a call routing service to minimize the distance to the nearest ARN could be provided by the LDC, or regional 800 numbers may be assigned. In the latter case, labels on each pay telephone indicate the 800 number to be called. A destination number and credit card or Regional Bell Operating Company (RBOC) calling card number are entered by the caller and verified by the system. The caller then leaves a message which is digitized and stored at the ARN and later delivered to the intended recipient. Before delivery, the ARN manager determines if the intended recipient's location is nearer an ARN different from the ARN which recorded the message. If this condition is met and enough time exists before the next scheduled delivery attempt, a high speed data transfer of the digitized message is arranged to transfer the message from the ARN which recorded the message and the ARN which is nearer the intended recipient. In this way, the previously discussed problems related to long distance transmissions are reduced.

Other audio response services offered by the present invention include, but are not limited to, college registration services, banking or credit card balance information, check guarantees, credit card verification, catalog ordering, cash register receipt reporting, stock market information, business news, sports news, weather news, and airline flight information.

It is therefore an object of the present invention to provide an enhanced wide area audio response system which provides enhanced audio response services throughout a wide area efficiently and cost effectively.

Another object of the present invention is to provide an audio response system which minimizes traditional problems related to long distance transmissions and reduces initial start-up costs.

Yet another object of the present invention is to provide an audio response system which includes a plurality of audio response nodes remotely distributed over a wide area network and controlled by a central controller wherein all call control programs are stored and executed by the central controller.

Still another object of the present invention is to provide a shared resource audio response system which includes a plurality of remotely distributed audio peripheral units which include digital representations of analog audio signals stored on digital storage media.

Still another object of the present invention is to provide a wide area audio response system which includes audio response nodes which include digital storage media, conversion devices for converting analog signals into digital representations and converting digital representations into analog signals, detecting devices connected to user telephone lines for detecting predetermined frequencies, and frequency generating devices for supplying analog signals to the connected user telephone lines.

Still another object of the present invention is to provide a wide area audio response system which includes audio peripheral nodes which include channel banks, switching devices, audio response units, PAD'S, and MODEM'S, which are co-located in LDC POP'S, which are connected to LDC switches, and which communicate with the LDC switches through the 4-wire E&M wink start protocol.

Still another object of the present invention is to provide a wide area audio response system which includes an ARN manager which is a highly reliable and continuously available, fault tolerant, and redundant general purpose controller which offers utility grade service to each ARN and is capable of processing a very large number of calls at many different ARN's simultaneously.

Still another object of the present invention is to provide a wide area audio response system which includes an ARU connected to an ARN manager to provide error notification through accessing a remote paging service.

Still another object of the present invention is to provide a method of providing a wide area audio response system which receives caller information at a plurality of audio peripheral nodes, transfers the information to a central controller, processes the information at the central controller, transfers control commands to the audio response nodes, and supplies the caller with analog audio signals converted from stored digital representations of the analog audio signals.

Still another object of the present invention is to provide a method of providing a wide area audio response system which functions as a voice messaging system to record messages and destination telephone numbers from callers and to subsequently forward the messages to the intended recipients.

Other objects, features, and advantages of the present invention will become apparent upon reading and understanding this specification taken in conjunction with the attached drawings.

DETAILED DESCRIPTION OF THE PREFERRED EMBODIMENT

Identification of Elements

Figure 1:
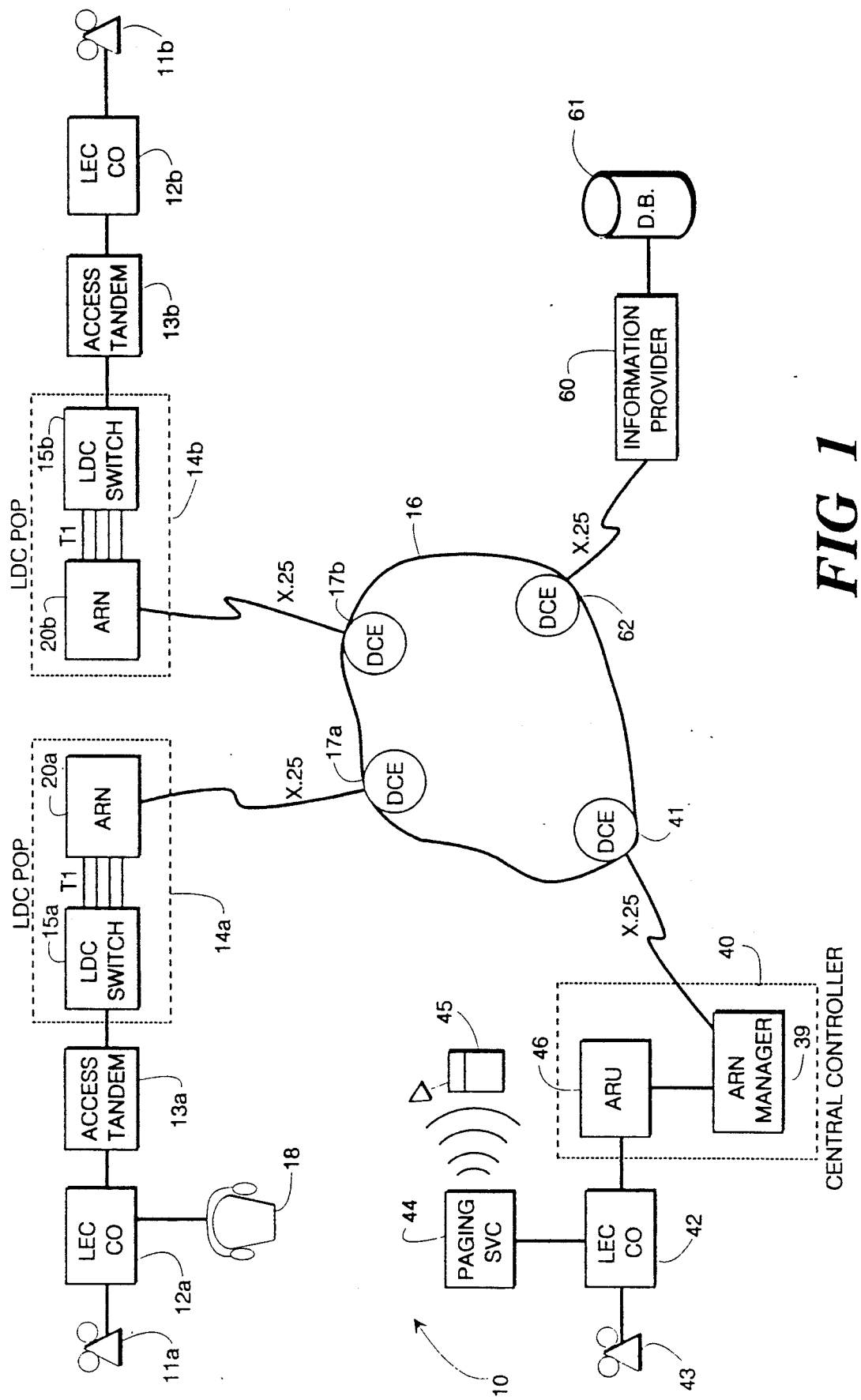
FIG. 1 is a block diagram representation of the preferred embodiment of the present invention.

Referring now in greater detail to the drawings in which like numerals represent like components throughout the several figures, the preferred embodiment will now be described. References to components not appearing in figures being described and not otherwise noted are understood to refer to FIGS. 1 or 2. FIG. 1 shows a block diagram representation of the preferred embodiment of the enhanced wide area audio response network 10. User telephones 11a and 11b are connected to Local Exchange Carrier (LEC) Central Office's (CO's) 12a and 12b. (The letters "a" and "b" are used to indicate similar elements and suggest a plurality of the elements; therefore, the letters will. henceforth in large part be disregarded in this description) A very large number of telephone stations are typically serviced by LEC CO 12. Live operator bank 18 is also connected to LEC CO 12. Access tandem 13 connects LEC CO 12 to Long Distance Carrier (LDC) Point of Presence (POP) 14. LEC CO 12 and access tandem 13 represent the telecommunications link necessary to deliver signals front user telephone 11 & live operator bank 18 to LDC POP 14. Other LEC CO's or local tandems may be interconnected between LEC CO 12 and access tandem 13 as is known in the industry.

Within LDC POP 14 is LDC switch 15 connected through T1 lines to Audio Response Node (ARN) 20. Data Circuit-terminating Equipment (DCE) 17 is seen connecting ARN 20 to Packet Switched Public Data Network (PSPDN) 16 over an X.25 link. DCE 41 connects Audio Response Node (ARN) manager 39, which is located within central controller 40 and connected to Audio Response Unit (ARU) 46, to PSPDN 16. DCE 62 connects information provider 60, which is connected to database 61, to PSPDN 16. ARU 46 is seen connected to LEC CO 42 which is connected to support personnel telephone 43 and paging service 44. Beeper 45 is connected to paging service 44 through Radio Frequency (RF) waves, as is indicated in FIG. 1.

Figure 2:
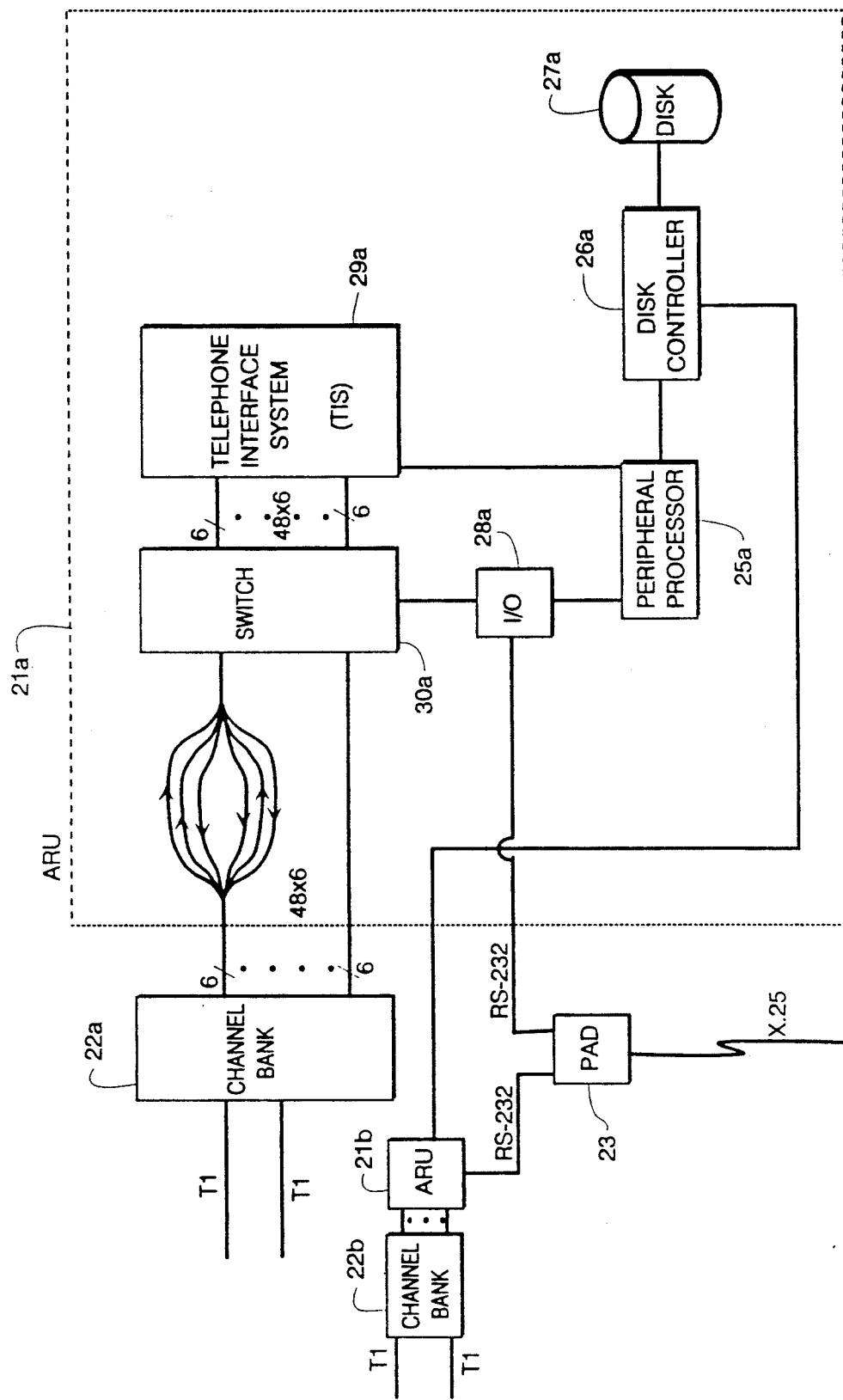
FIG. 2 is a block diagram representation of the Audio Response Node of shown in FIG. 1.

Referring now to FIG. 2, a block diagram representation of ARN 20 is shown. Two channel banks 22a & 22b are seen connected to T1 lines and Audio Response Units (ARU's) 21a & 21b. PAD 23 is connected to both ARU's 21a & 21b. Channel bank 22 is connected to ARU 21 through forty-eight, 4-wire E&M, channels which travel over six wires per channel. Within ARU 21, the 48 channels are connected through switch 30 to Telephone Interface System (TIS) 29. Peripheral processor 25 is connected to TIS 29, disk 27 through disk controller 26, and switch 30 through Input/Output (I/O) system 28. ARU 21, also through I/O 28, is connected to PAD 23 which provides the X.25 link. Disk controller 26a is connected to disk controller 26b (not shown) for redundant disk access.

Figure 3:
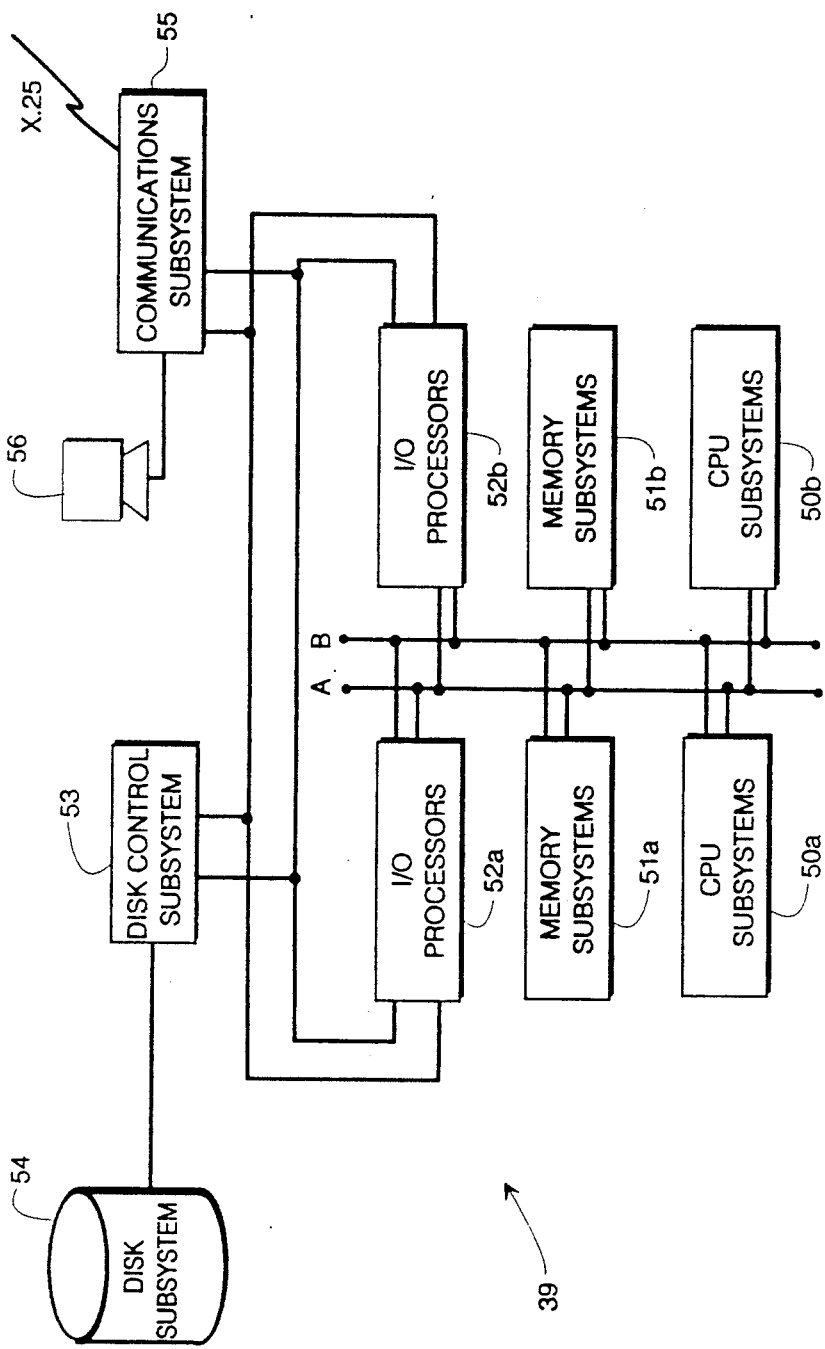
FIG. 3 is a block diagram representation of the Audio Response Node manager shown in FIG. 1.

Referring now to FIG. 3, a block diagram representation of ARN manager 39 is shown. ARN manager 39 is shown with a redundant architecture. Two buses, A & B, are both connected to redundant hardware components, including I/O processors 52a & 52b, memory subsystems 51a & 51b, and CPU subsystems 50a & 50b. I/O processors 52a & 52b are both connected to communications subsystem 55 and disk subsystem 54 through disk control subsystem 53. The X.25 link is shown connected to communications subsystem 55.

Terminal 56 is also shown connected to communications subsystem 55.

Figure 4:
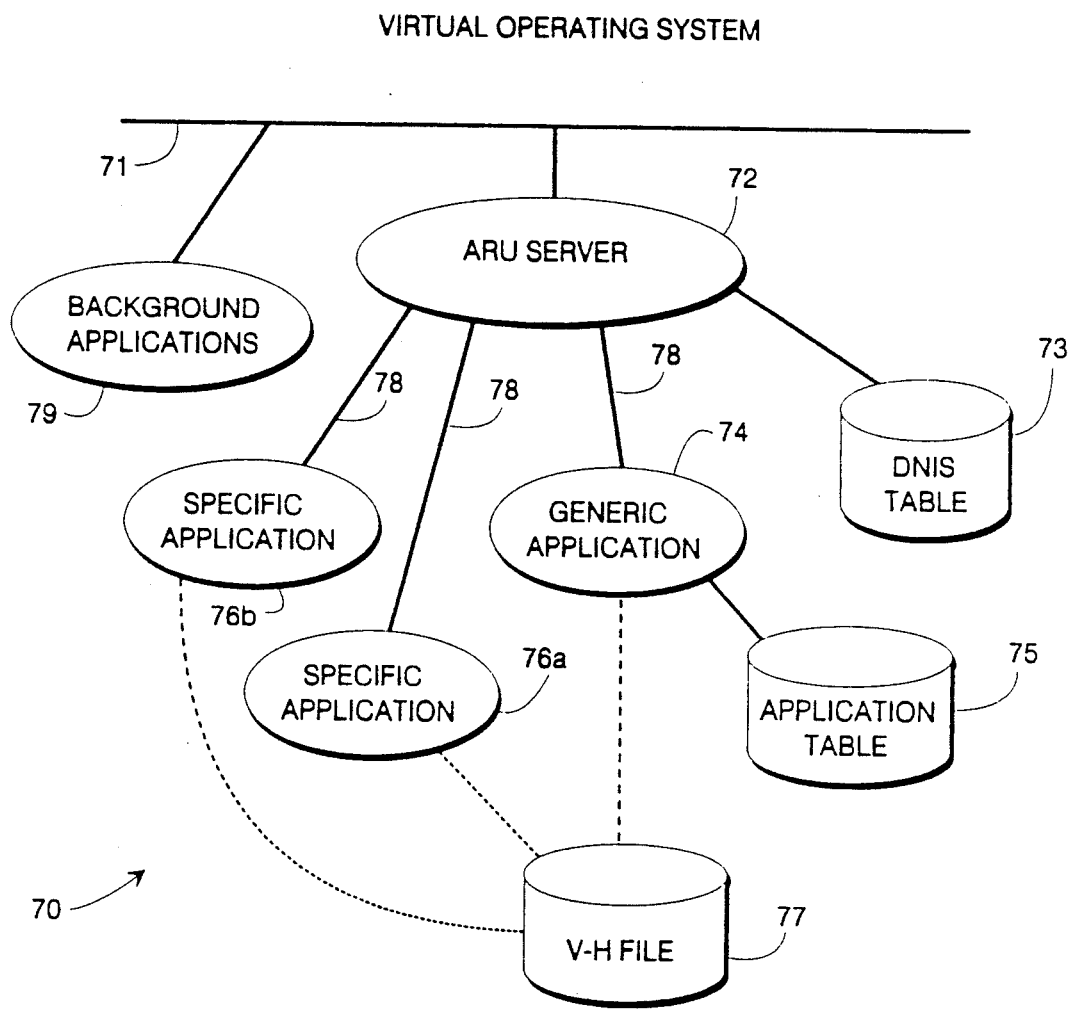
FIG. 4 is a block diagram representation of the software hierarchy of the Audio Response Node manager shown in FIG. 1.

Referring now to FIG. 4, a block diagram representation of the software hierarchy 70 of ARN manager 39 is shown. Background applications 79 and ARU server 72 are seen running under virtual operating system 71. ARU server 72 is seen having the ability to access DNIS table 73. Through inter-process communications 78, ARU server 72 communicates with various applications, including specific applications 76a & 76b and generic application 74. Specific applications 76 and generic application 74 have the ability to access V-H file 77. Generic Application 74 is seen accessing(g application table 75.

Referring now to FIGS. 5-9, a flow chart representation of the steps taken by the preferred embodiment of a voice messaging application. Each step is explained in detail below.

Description of Elements

Referring in more detail to FIG. 1, user telephone station 11 is seen connected to Local Exchange Carrier Central Office (LEC CO) 12. User telephone 11 can be any of a large variety of currently known telephone stations, including, but not limited to, rotary, Dual Tone Multi-Frequency (DTMF), private telephone stations, radio telephone stations, public pay telephone stations, smart telephone stations, and Private Branch Exchange (PBX) stations. Live operator bank 18 is also seen connected to LEC CO 12 and includes one or more live operators who remain ready to assist callers. All methods through which signals travel from user telephone 11 and live operator bank 18 to LDC POP 14 are considered covered by the scope of the present invention. A large network to LEC CO's, including end CO's, local tandems, (not shown) and mobile telephone switch offices (not shown) may be encountered before an access tandem 13 is found. LEC's are understood to include, but are not limited to, Regional Bell Operating Companies (RBOC's) and the Independent Telephone Companies (ITC's). The technical nature of CO's are considered understood by those skilled in the art of telephony.

Access tandem 13 is a special CO which serves as the gateway to provide all Ottier Common Carriers (OCC's) equal access to the LEC'S. Other Common Carriers (OCC's) include Long Distance Carriers (LDC's), specialized carriers, resale common carriers, value added common carriers, and radio common carriers. Common examples of LDC's include MCI, Sprint, and AT&T. An LDC Point of Presence (POP) 14 is connected, normally over trunk groups, to an access tandem 13. POP 14 is a facility maintained by an LDC where the LDC takes over responsibility for hauling communications across Local Access & Transport Areas (LATA) boundaries. POP 14 may also be connected directly to user telephone 11 or live operator bank 18 through the common technique known as by-passing.

Each LDC POP 14 contains an LDC switch 15 which is responsible for switching calls through LDC POP 14. Audio Response Node (ARN) 20 communicates through Digital Signal Level 1 (DS1) signals over a plurality of T1 lines with LDC switch 15. Co-location with LDC switch 15 reduces delay and signal degradation. Local loop charges and translation to Plain Old Telephone Service (POTS) from 800 number service can also be avoided. T1 lines offer a 1,544,000 bits per second bandwidth, Time Division Multiplexed (TDM), two-way connection which typically travels over two normal pairs of twisted copper wires.

Referring in more detail to FIG. 2, channel bank 22 is connected to two T1 lines carrying TDM digital signals on the LDC switch 15 side, and forty-eight 4-wire E&M channels carrying analog signals on the ARU 21 side. Each 4-wire E&M channel consists of six wires, four wires for two-way transmission of voice (transmit & receive pairs) and two wires for signalling (E&M wires). E&M is an interoffice signalling protocol commonly used by carriers. The particular use of the E&M wires is discussed below iii more detail. Channel bank 22 is a conventional channel bank performing the required Pulse Code Modulated (PCM) functions of sampling, quantizing, and coding in a TDM system. Two channel banks 22a & 22b are provided for fault tolerance and peak capacity situations. The number of T1 lines connected to each channel bank 21 and the number of channel banks 21 may be varied within the scope of the present invention.

ARU 21 is an audio peripheral device. One acceptable example is commercially available as a BTIII with an Enhanced Super Switch from Perception Technology Corporation of Canton, MA. The major functional components of ARU 21 can be grouped to include switch 30, TIS 29, peripheral processor 25, disk controller 26, disk 27, and I/O system 28. Forty-eight analog channels enter ARU 21 from channel bank 22, and an RS-232 line exits from ARU 21 to PAD 23. There is also a connection between disk controller 26a of ARU 21a and disk controller 26b (not shown) of ARU 21b for redundant disk access. By always writing to both disks, reliability and availability are increased.

Switch 30 provides the ability to connect ally connected line to any other connected line, an "all to all" switch. Switch control commands travel through PAD 23 from ARN manager 39. The commands may then go directly to switch 30 (as though I/O system 28 were simply a short circuit), or they may go into peripheral processor 25 through I/O system 28 where they are interpreted to cause peripheral processor 25 to signal switch 30 through I/O 28.

TIS 29 provides several related functions. All forty-eight analog channels terminate at TIS 29. TIS 29 is capable of detecting and producing on each channel Multi-Frequency (MF) signals, Dual Tone Multi-Frequency (DTMF) signals, and E&M signals (including −48 volts and ground). Analog audio signals are received on each receive pair and converted to digital representations by TIS 29 and delivered to peripheral processor 25, which then, after temporarily storing the digital representations in Random Access Memory (RAM), supplies the digital representations to disk controller 26 to be stored on disk 27. Conversely, peripheral processor 25 reads digital representations of audio analog signals from disk 27 through disk controller 26 and supplies those digital representations to TIS 29 which converts them to analog audio signals and supplies then to a transmit pair. The method through which these conversions take place is considered understood in the art.

Peripheral processor 25 functions as an interpreter for commands received from ARN manager 39 through I/O system 28 and PAD 23. Commands include, but are not limited to: Answer a call, record analog input, hang-up a call, initialize a call, play a particular message. Responses to commands include, but are not limited to:

caller hung up, dial complete, line answered, recording stopped on silence, and file number of stored message. No scripts or command sequences are stored in ARU 21. Commands for switch 30 can also be received to, among other tiling, connect a caller with live operator bank 18. After it is realized that a caller needs assistance, a call is initiated through TIS 29 to operator bank 18 and then connected to the caller through switch 30.

PAD 23 is necessary for a non-packet mode device to communicate in PSPDN 16. A PAD is a device which speaks to a non-packet mode device using the native protocol of the device, which might be asynchronous, bisynchronous, or any other protocol, and converts the data stream into X.25 protocol for communication with the network DCE. In this application, the network DCE is a MODEM represented as DCE 17. The details and advantages of the PSPDN 16 are considered to be well understood by those ordinarily skilled in the art. Also, as previously stated, other communication networks, including leased lines, are considered within the scope of the present invention.

Referring now to FIG. 3, ARN manager 39 is shown in more detail. ARN manager 39 is a fault tolerant, general purpose controller which offers utility grade service and is capable of processing many applications simultaneously. One acceptable example of ARN manager 39 is available commercially as a Stratuse XA2000 model 30 from Stratus Computer, Inc. of Marlboro, Mass. FIG. 3 reveals the redundant architecture which ensures continuous application reliability and availability. This redundant architecture includes duplicate buses A & B, I/O processors 52a & 52b, memory subsystems 51a & 51b, and cpu subsystems 50a & 50b. It one component fails, its partner component typically continues so that there are normally two components performing the same function at the same time. Also, each CPU subsystem contains duplicate CPU's which also process the same data at the same time. A total of four processors work on the same data at the same time. Logic comparators continually compare the results of each processor. If the processors on a board disagree, that particular board is taken off line, an error signal is generated, and its partner component continues without any processing degradation.

The function of each ARN manager component is straight forward. CPU subsystems 50 provide processor functions for ARN manager 39. Memory subsystems 51 provide operating memory, and I/O processors 52 provide input and output capabilities. Disk control subsystem 53 provides control of disk subsystem 54, which stores conventional operating system software and application software. Terminal 56 provides human access to ARN manager 39 through communications subsystem 55, which also provides packet mode operation for the X.25 protocol. As discussed above, ARN manager 39 is capable of interfacing with remote information providers 60 and their corresponding databases 61. Through communication subsystem 55, the native protocol of each information provider 60 can be used to communicate with information provider 60.

Referring now to FIG. 4, a block diagram representation of the software hierarchy of ARN manager 39 is shown. Running below virtual operating system 71 are background applications 79 and ARU server 72. Background applications 79 include applications which provide services which include, but are not limited to: billing, testing, error detection, and error notification. Billing services accumulate and format transaction records of each caller into appropriate billing formats for use locally or by remote billing agencies. Testing services routinely test various components throughout the system, including each connected telephone line of every ARN 20. ARN manager 39 issues commands to each ARN 20 to dial numbers handled by that ARN 20 and subsequently commands ARN 20 to answer the call. ARN manager 39 then commands ARN 20 to transmit a string of DTMF tones on the out-going line and to record them on the other. By comparing the digits supplied with those which were recorded, verification of line availability is established. By "busying out" certain lines and by ensuring that LDC switch 15 sends new calls to channels on a rotation-basis, each line can be tested. Also, other tests, including calling out on all connected lines at the same time, aid in availability verification. If one or more lines are not available, an appropriate error code is generated by ARN manager 39.

The error detection and error notification services function to evaluate error signals received from various components and the testing services to identify the various types of errors. Based on that information, appropriate service personnel are notified of the error. Referring momentarily back to FIG. 1, ARN manager 39 is seen included in central controller 40 along with ARU 46, which is similar to ARU 21 of FIG. 2. Through ARU 46, ARN manager 39 communicates with appropriate service personnel. Error notification involves commanding ARU 46 to call appropriate numbers through local lines through LEC CO 42 to service personnel telephone 43. Different numbers may be dialed depending on various factors, including type of error detected or time of day, ie., a service technicians home number could be dialed if the error occurred in the middle of the night. After a service technician is accessed, ARN manager 39 commands ARN 46 to play appropriate messages depending on the error detected. Also, paging service 44 call be accessed to provide paging information about the error detected, including the paging number of appropriate service personnel and error identification information. Paging service 44 then notifies the appropriate service personnel by transmitting error identification information over radio waves to beeper 45. The appropriate service personnel may then call into the system to address the error. These error detection and error notification services are considered unique.

Referring again to FIG. 4, ARU server 72 is seen running under virtual operating system 71. ARU server 72 is a multi-tasking process which provides an interface between applications and ARU's 21. When a call arrives at ARU 21, ARU server 72 receives initial information from ARU 21. The initial information normally includes DNIS digits (sometimes referred to as Direct Inward Dialing (DID) digits). DNIS number table 73 is then accessed by ARU server 72 to determine which application should receive control for that particular call. The referenced applications may be a specific applications 76 or an application accessed through generic application 74. ARU server 72 then passes control to the appropriate application by passing the initial information through inter-process communications 78. If the corresponding application is serviced by generic application 74, additional identification data from DNIS table 73 is also passed along with the initial information to generic application 74 to further define which application in application table 75 services the referenced DNIS number. Through this table method, applications can be changed dynamically, ensuring continuous availability.

After an application receives control, processing unique to that application is performed, and instructions for ARU 21 are sent to ARU server 72, which converts the instructions into actual ARU 21 commands and sends them to ARU 21. Applications also send ARU server 72 timing information and the expected numbers of digits in certain ARU 21 responses. ARU server 72 tracks the time since each command was sent to ARU 21 and collects and counts digits in certain ARU 21 responses. ARU server 72 informs an application when ARU 21 has not responded within a certain amount of time and when the received number of digits was not as expected. Certain applications also have access to V-H file 77. V-H (Vertical-Horizontal) file 77 is a file of volatile data which is provided by Bell Communications Research Company (Bellcore). Telephone numbers may be verified as actual numbers, and time zone information is also available from V-H file 77.

APPLICATION OPERATION

Referring now to FIGS. 5-9, a flow chart representation of the steps taken by the present invention during the preferred embodiment of a voice messaging application is shown. The reader is directed to refer to previously discussed figures when references are made to previously described components. Voice messaging is only one of the many applications which are provided by the present invention.

Figure 5:
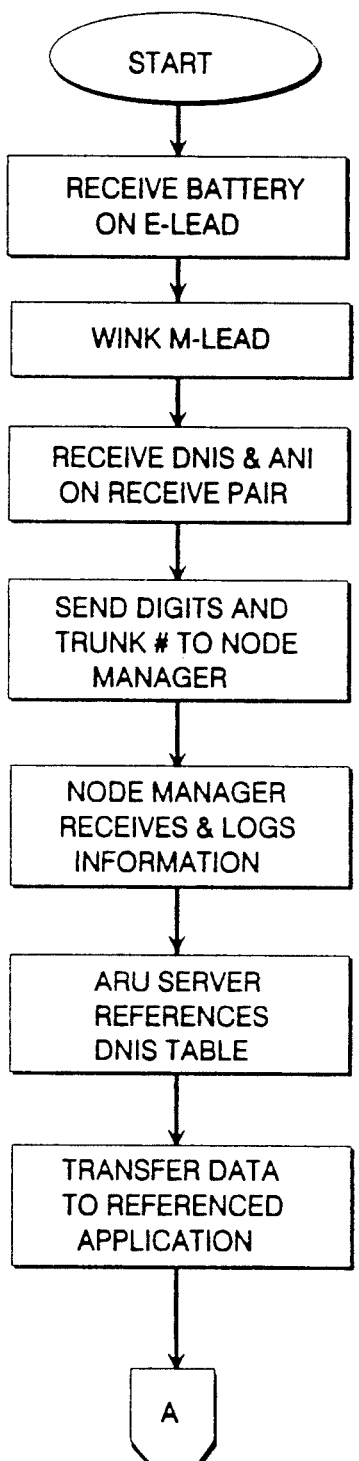
FIGS. 5-9 are flow chart representations of the steps taken by the present invention during the preferred embodiment of the voice messaging application.

FIG. 5 shows the beginning of the process. When a caller dials a number assigned to the voice massaging application, a control signal is received at an ARN 20. In the preferred embodiment, the caller dials an 800 (INWATS) number from a public pay telephone 11. After the call makes its way to the LDC POP 14 in which ARN 20 exists, LDC switch 15 signals to channel bank 22 along the connected T1 lines that a caller is attempting to access ARN 20. The signalling information is extracted from the TDM bit stream by channel bank 22 and supplied to the E&M wires in a particular channel. The current invention uses a wink start protocol. When a call is coming into ARN 20, a continuous battery signal ($-48$ volts) is received on the E-lead of ARU 21. ARU 21 then acknowledges receipt of the battery signal by winking back on the M-lead of ARU 21. A wink is a 250 millisecond pulse of battery. Channel bank 22 modulates the wink into the TDM bit stream. LDC switch 15 then, after receiving the wink, sends DNIS and ANI digits through MF or DTMF signals (depending on the ability of TIS 29). The DNIS & ANI digits are converted into digital representations (digital digits) and sent with the line number which received the call to ARN manager 39. ARU 21 is configured to automatically transmit, along with line numbers, digital representations of all MF or DTMF signals received. At this point the telephone call has not been answered.

When ARN manager 39 receives the digits, ARU server 72 references DNIS table 73 and determines which application should receive the received information. Up until this point in the process, all calls are handled identically. When data enters or exits ARN manager 39, a log entry is made to track communication with each ARU 21. Every communication also contains a reference to the particular line and ARN 20 which received the call. If numbers corresponding to the voice messaging application were dialed by the caller, the voice messaging application receives the information and control. All of the received information, including the DNIS digits, ANI digits, and the line number are transferred through an inter-process communication 78 to the voice messaging application.

Figure 6:
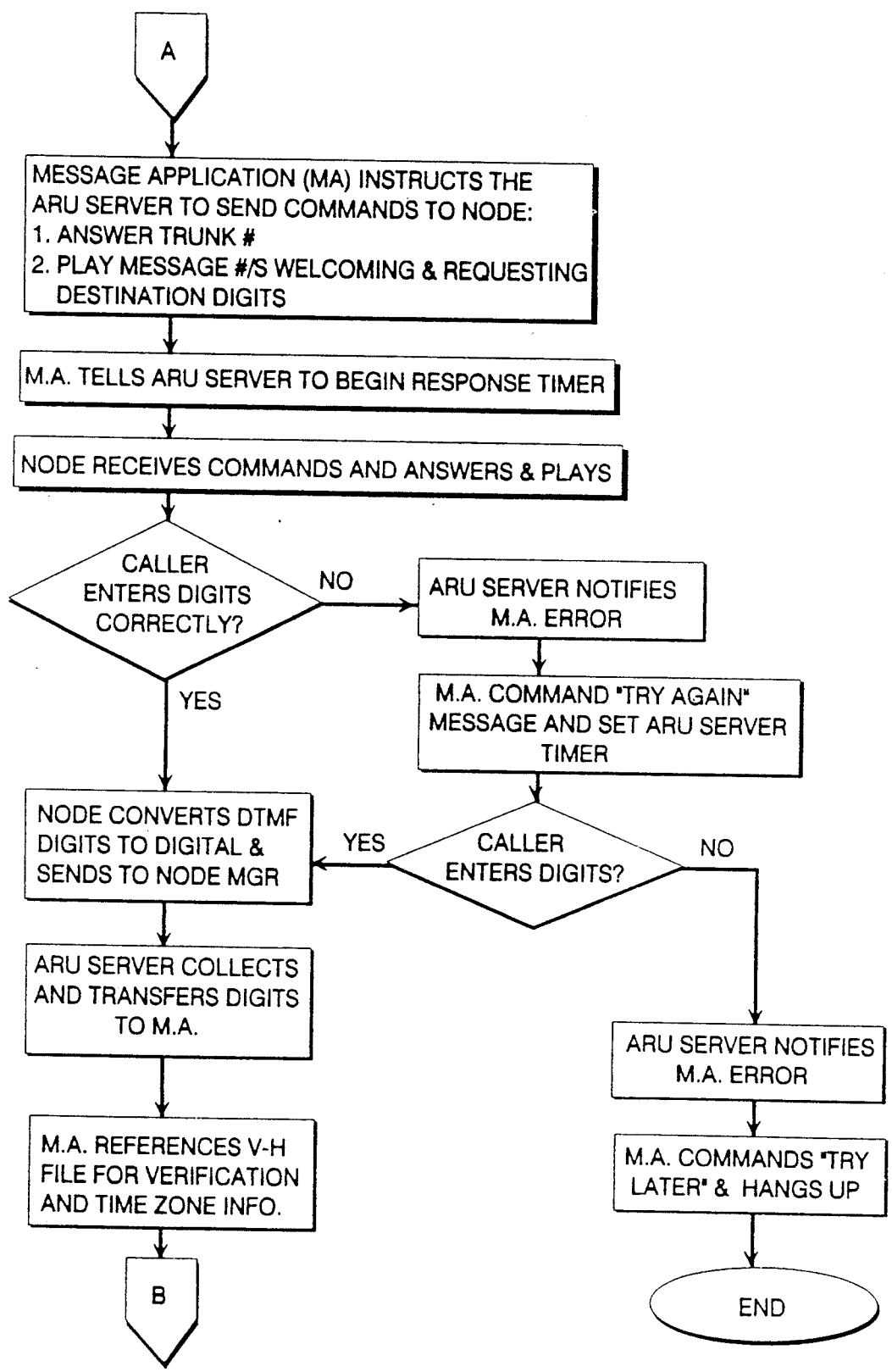

Referring now to FIG. 6, the voice messaging application (referred to as Message Application (MA) in the figures) receives and processes the information received, which may include referencing one or more additional DNIS tables to identify which specific welcome message should be generated, and issues instructions to ARU server 72. These instructions include commanding ARU 20 to answer the call and to play a particular message combination defined by storage addresses which welcomes the caller and requests destination digits. MA also instructs ARU server 72 to start a tinier for a response time. By keeping track of elapsed time at ARN manager 39, rather than at ARN 20, tinting changes are easier, and the system is more flexible. ARU server 72 converts the instruction received and transmits ARU 20 commands to ARU 20. Peripheral processor 25 of ARU 20 receives the commands and interprets them for ARU 20. When the answer command is received, peripheral processor 25 signals TIS 29a to place battery on the ARU 20 M-lead, which seizes the line and answers the call. LDC switch 15 then logically connects the transmit and receive pairs to the caller. Peripheral processor 25 then signals disk controller 26 to access disk 27 for the referenced messages. These messages include the "Welcome" prompt and the "Enter your destination number" prompt. The messages are directed to TIS 29 which converts them into analog audio signals and supplies them to the transmit pair of tile referenced line. The caller then receives these analog audio signals at user telephone 11.

Depending on what the caller does at this point, alternate programming routes are taken by ARN manager 39. If the caller does not enter any digits before the time set by MA in ARU server 72, or the caller enters the wrong number of digits, ARU server 72 notifies MA of the error. MA then commands ARU 21 (by sending instruction through ARU server 72 which converts the instructions to commands and sends them to ARU 21, hereinafter referred to as commanding ARU 21) to play a "Try again" prompt and instructs ARU server 72 to set another response timer. ARU 21 complies with these commands, and the caller hears the prompt. If the caller again fails to enter the correct number of digits within the allotted time, ARU server 72 again notifies MA of the error. MA then commands ARU 21 to play the "Try again later" prompt and to disconnect the caller to free the line. The steps described in this paragraph are later referred to as the Error "Try Again" or End Routines.

Alternately, if the caller entered the correct number of destination digits within the allowed response time after the first request or after the "Try again" prompt, ARU 21 converts the DTMF destination digits received from the caller into digital representations of the DTMF digits, and transmits the digits to ARU server 72. ARU server 72 again collects the digits and transfers them to MA which then references V-H file 77 to verify that the digits received from the caller were not invalid. The NPA-NXX digits of the destination telephone are referenced in V-H file 77. (NPA-NXX are the first six digits of the conventional ten-digit telephone number, often referred to as the Area Code and the Exchange) Time Zone information is also extracted from the file 77 if it is desirable to prevent late night delivery of messages. Other information in V-11 file 77 is also available to MA.

Figure 7:
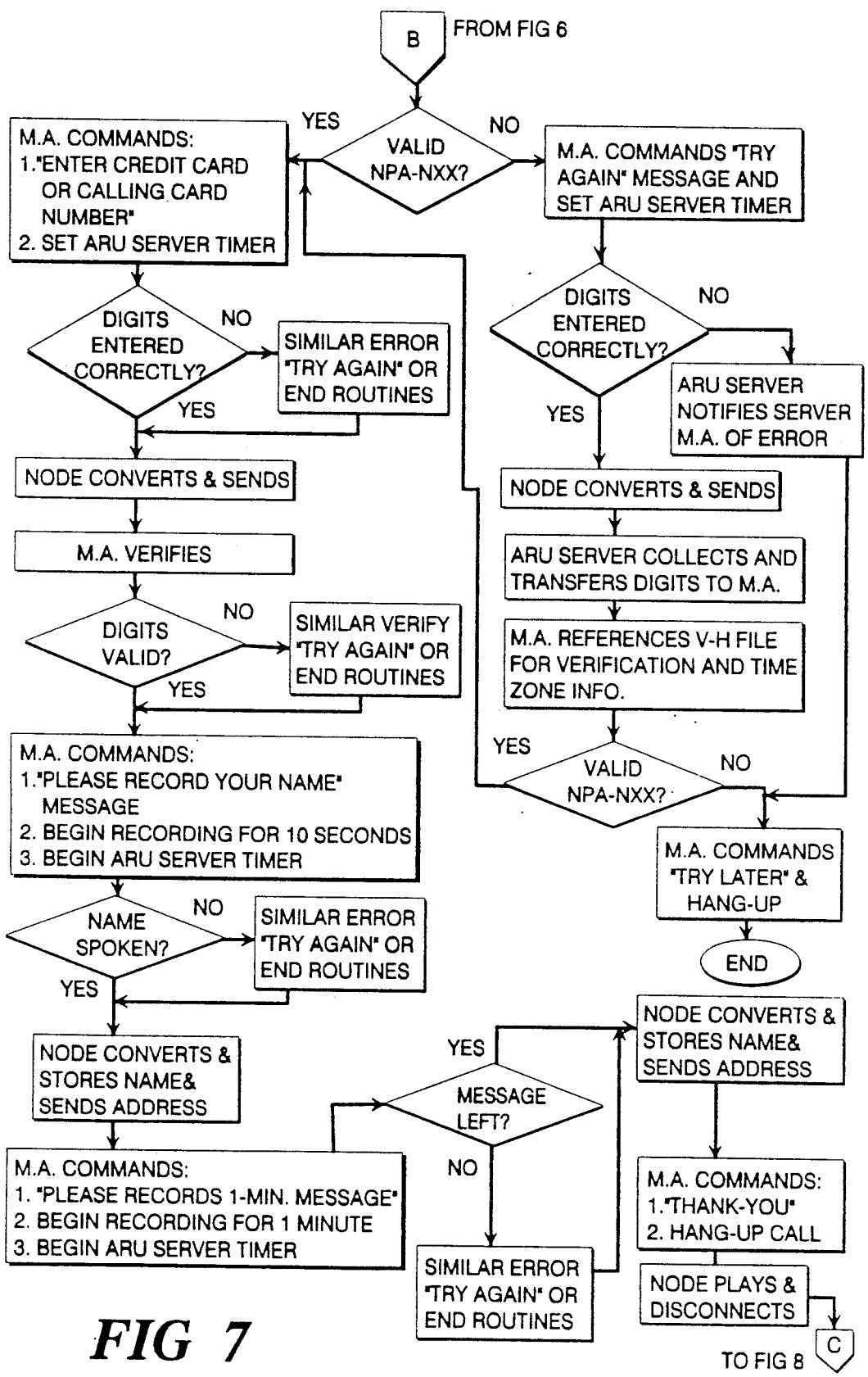

Referring now to FIG. 7, if the digits entered are invalid, the Verify "Try Again" or End Routines are executed. MA commands ARU 21 to play a "Try Again" prompt and instructs ARU server 72 to set another response timer. As before, if the correct number of digits are not entered within the allowed response time, ARU server 72 notifies MA of the error, and MA commands ARU 20 to play the "Try again later" prompt and to disconnect the caller to free the line. If the correct number of digits are received within tile allowed response time, ARU 21 again converts the signals into digits and sends them to ARU server 72. ARU server 72 collects the digits and transfers them to MA. MA again references V-H file 77. If the digits are again invalid, MA commands ARU 21 to play the "Try again later" prompt and to disconnect the caller to free the line. The preceding steps described in this paragraph are later referred to as the Verify "Try Again" or End Routines.

Alternately, if the destination digits received after the first or second request are not invalid according to V-H file 77, MA commands ARU 21 to play the "Enter your credit card or calling card number" prompt and instructs ARU server 72 to set a response timer. As before, if the correct number of digits are not received by ARU server 72 within the allowed response time, similar Error "Try Again" or End Routines are executed. Alternately, if the correct number of digits are entered within the allowed response time after the first or second request, ARU 21 converts the received signals into digits and transfers them to ARU server 72. After receiving the digits from ARU server 72, MA verities that the numbers entered are not invalid. Various methods known in the art are available to MA for number validation. Depending on whether the digits are valid, similar Verify "Try Again" or End routines are again executed.

If the digits are valid, MA commands ARU 21 to play the "Please record your name" prompt and to begin recording for 10 seconds. ARU server 72 is also instructed to set a response timer for a confirmation from ARU 21. If a name is not spoken, no confirmation is received, and similar Error "Try Again" or End Routines are executed. If a name was spoken and recorded, ARU 21 converts the analog audio signals into digital representation of the analog audio signals and stores the data on disk 27 through disk controller 26. ARU 21 then transmits a confirmation in the form of the address of the stored message to ARU server 72. MA stores the address after receiving it from ARU server 72 and then commands ARU 21 to play the "Please record your one minute message" prompt and to begin recording for 1 minute. ARU server 72 is also again instructed to set another confirmation timer. As before, if no message is recorded, the Error "Try Again" or End routines are executed. It a message is recorded, ARU 21 again saves the message and transmits the address of the saved file. MA again saves the address and then commands ARU 21 to play the "Thank you" prompt and to disconnect the caller to free the line. ARU 21 complies, and the call is ended.

Figure 8:
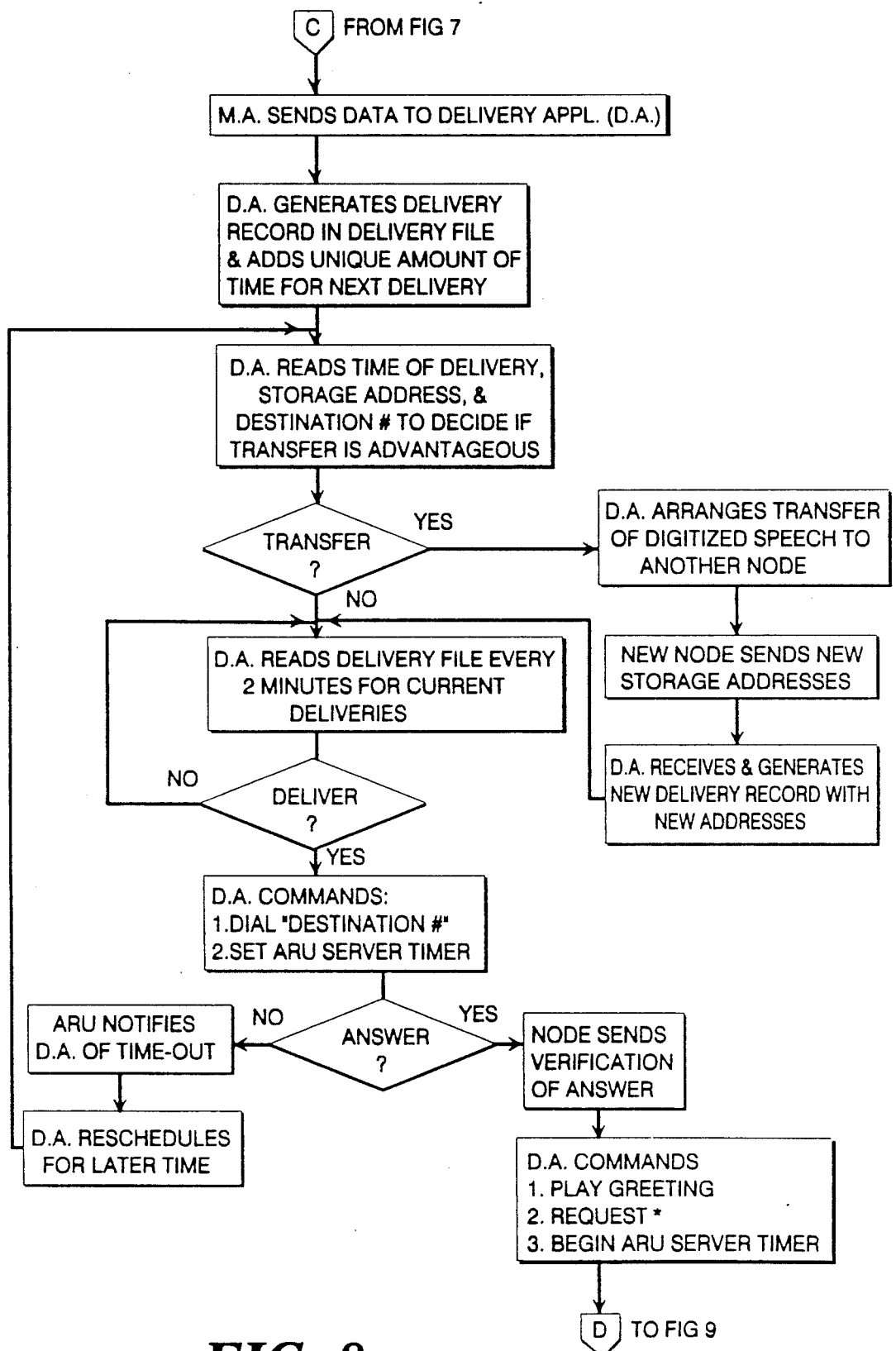

Referring now to FIG. 8, MA sends all applicable information to the Delivery Application (DA) which handles delivery of the message. The information includes the destination number, storage addresses of name & message recordings, DNIS information, delivery interval information, and V-H file 77 information. Delivery interval information includes intervals to effect delivery attempts at 15 minutes, 30 minutes, 1 hour, 1.5 hours, 2 hours, 3 hours, 5 hours, 8 hours, 12 hours, and 16 hours. DA then generates a delivery record in a delivery file which includes portions of the above mentioned information and the next delivery time computed from the delivery intervals. To reduce problems related to long distance calls to the destination number, DA will determine whether a high speed data transfer of the digitized recordings to an ARN 20 which is closer to the destination number is advantageous. After reading the delivery time, the storage address, and the destination number of the delivery record, DA decides, based on distance calculations, if enough time exists for a file transfer to a closer ARN 20. If enough time exists to safely complete the transfer, DA arranges a transfer between ARN's 20. The new ARN 20 then sends the new addresses of the recordings. DA then generates a new delivery record with the new addresses.

Alternately, if DA decides that a transfer is not advantageous, no transfer is attempted at this time. DA normally reads the delivery file every 2 minutes for current deliveries. When a record with a current delivery time is found, I)A commands ARU 21 to dial the destination number and instructs ARU server 72 to set a response tinier. To dial a number, battery is placed on the M-lead of ARU 21. LDC switch 15 winks back on the E-lead of ARU 21 in acknowledgment. ARU 21 then out-pulses the destination digits over the transmit pair. LDC switch 15 indicates an answer by placing battery on the E-lead of ARU 21, thereby seizing the line. If there is not an answer on the line, ARU server 72 notifies DA of a time-out, and DA generates a new record based on a new delivery time, arid control returns to the point where DA determines if a transfer is advantageous. Alternately, if the call is answered, ARU 21 transmits an answer verification signal to ARU server 72. DA then commands ARU 21 to play the "Good Afternoon" (or "Morning", depending oil the time) you have a message from prompt, the name message, and the "Please press the star key if you would like to receive the message" prompt. ARU server 72 is also instructed to start a response timer. The star key is simply used to verify that someone answered the telephone.

Figure 9:
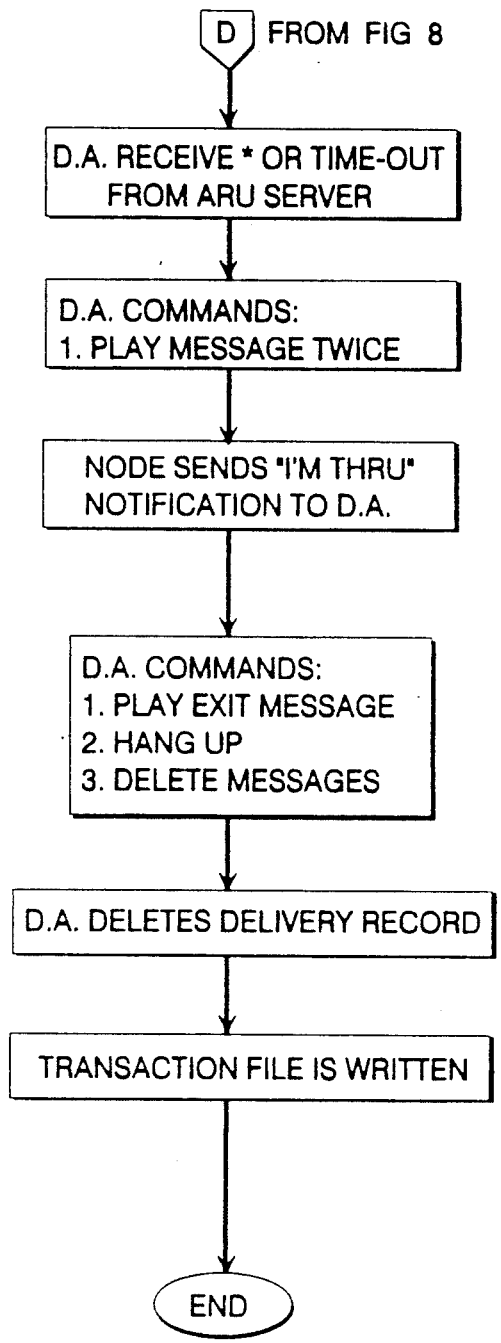

Referring now to FIG. 9, when the star key is pressed or when ARU server 72 times out, DA commands ARU 21 to play tile message twice and to notify DA when the play-back is complete. After DA is notified that the play-back is complete, DA commands ARU 21 to play the exit prompt, disconnect the caller to free the line, and to delete the name and message recordings. DA then deletes the delivery record and writes the delivery information to a transaction file which is later handled by the billing application previously discussed.

Other audio response applications may also be handled by the present invention. Operator assistance from operator bank 18 may also be provided during arty of the applications when no response is received by the caller (assuming a rotary phone is being used) or when DTMF keys are used to request operator assistance. A college registration IVR system is another application. Through methods similar to the previously described voice messaging application, students would be allowed to call into the system over a 900 number. (900 numbers are similar to ordinary telephone calls with the exception that they normally cost callers additional money which is paid to the service provider, who could then split the revenue with the college) Students would enter registration information in response to audio prompts. ARN manager 39 could then interface with information provider 60 which would be the college registration computer in this application. Alternately, tile registration could be handled by ARN manager 39 without the need to interface with another computer. If many colleges throughout tile country used the service, students calling from home, ie., not in the same town as the college, could use an ARN 20 which is closer to him to reduce the previously discussed problems related to long distance communication. Not only would the college not be forced to buy an expensive IVR system to provide this service, a new source of revenue would be provided. Alternately, local or 800 numbers could also be made available.

Other audio response services include banking and credit card information services. ARN manager 39 could receive nightly batched information from the bank or credit card company computer (information provider 60). A customer could receive balance information over the telephone. Check guarantee services could also be provided wherein a caller maintains a business and needs to verify that one of his customer's checks is valid. Catalog ordering services are obviously adaptable to this system. Stock market information, business news, sports news, weather news, and airline flight information are all examples of volatile information categories maintained on information provider databases 61. ARN manager 39 can also provide an interface to several information providers 60 to provide a gateway to a variety of information.

While the embodiments of tile present invention which have been disclosed herein are the preferred forms, other embodiments of the present invention will suggest themselves to persons skilled in the art in view of this disclosure. Therefore, it will be understood that variations and modifications can be effected within the spirit and scope of the invention and that the scope of the present invention should only be limited by the claims below.

I claim:

1. Method of providing audio response services to callers from a wide area audio response network system, said method comprising the steps of:
   providing a plurality of audio peripherals remotely distributed over a wide area and connected to user telephone lines;
   connecting each of the plurality of audio peripherals through a network to a central controller which controls the operation of each of the plurality of audio peripherals;
   receiving user information at an audio peripheral through a user telephone line;
   transferring the user information from the audio peripheral through the network to the central controller;
   processing the transferred information at the central controller;
   transferring command signals from the central controller through the network to the audio peripheral;
   converting digital representations of analog audio signals stored at the audio peripheral into reproduced analog audio signals according to the transferred command signals;
   supplying the reproduced analog audio signals to the user telephone line; and
   repeating the steps of receiving user information, transferring user information, processing the transferred information, transferring command signals, converting digital representations, and supplying the reproduced analog audio signals until an audio response service is concluded,
   wherein every supplying of a reproduced analog audio signal to a user telephone line is in response to receipt of at least one command signal from the central controller, and
   wherein the transferred command signals include signals corresponding to the address of stored digital representations of analog audio signals.

2. Method of providing at least one audio response service to callers from a wide area audio response network system which includes a plurality of widely distributed audio devices connected to a central device, said method comprising the steps of:
   receiving notification at an audio device that a caller is placing a call and attempting to access an audio response service;
   transferring notification data from the audio device to a central device;
   processing the notification data at the central device to produce command data;
   transferring the command data from the central device to the audio device;
   answering the call at the audio device after receiving the command data from the central device;
   converting digital representations of analog audio signals stored at the audio device into reproduced analog audio signals;
   transmitting the reproduced analog audio signals to the caller;
   receiving operational caller data at the audio device;
   transferring representative caller data representative of the operational caller data to the central device;
   processing the representative caller data at the central a device to produce additional command data;
   transferring the additional command data to the audio device;
   converting digital representations of additional analog audio signals stored at the audio device into additional reproduced analog audio signals;
   transmitting the additional reproduced audio signals to the caller; and
   repeating, until an audio response service is concluded, the steps of receiving operational caller data, transferring representative caller data, processing the representative caller data, transferring the additional command data, converting digital representation of additional reproduced audio signals, and transmitting the additional reproduced analog audio signals, and
   wherein the transferred command data includes, at least, an address corresponding to digital representations of analog audio signals stored at the audio device.

3. Method of providing voice messaging services to callers from a wide area network system, the method comprising the steps of:
   providing a plurality of locationally diverse audio devices connected to a plurality of user telephone lines and a central device connected to the plurality of locationally diverse audio devices;

after a caller initiates a call, receiving caller information regarding the call through a user telephone line of the plurality of user telephone lines, wherein the caller information includes digits corresponding to, at least, the number initially dialed by the caller to access the audio device, transferring the caller information from the audio device to the central device.

reproducing onto the user telephone line at least one audio prompt from digital representations of the audio prompt stored in the audio device to prompt the caller to provide a destination number and the caller audio message from the caller in response to the reproduced audio prompt;

converting the caller audio message into a digital representation of the caller audio message;

storing a digital representation in the audio device;

calling the destination number of communicate with a message recipient; and reproducing to the message recipient the caller audio message from the digital representation of the caller audio message stored on the audio device.

4. Method of providing voice messaging services to callers from a wide area network system, the method comprising the steps of:

providing a plurality of locationally diverse audio devices connected to a plurality of user telephone lines and a central device connected to the plurality of locationally diverse audio devices;

after a caller initiates a call, receiving caller information regarding the call through a user telephone line of the plurality of user telephone lines;

transferring the caller information from the audio device to the central device;

transferring control commands from the central device to the audio device for reproducing onto the user telephone line at least one audio prompt from digital representations of the audio prompt stored in the audio device to prompt the caller to provide a destination number and speak a caller audio message;

receiving the destination number and the caller audio message from the caller in response to the reproduced audio prompt;

converting the caller audio message into a digital representation of the caller audio message;

storing the digital representation in the audio device;

calling the destination number to communicate with a message recipient; and reproducing to the message recipient the caller audio message from the digital representation of the caller audio message stored on the audio device.

5. Method of providing voice messaging services to callers from a wide area network system, the method comprising the steps of:

providing a plurality of locationally diverse audio devices connected to a plurality of user telephone lines and a central device connected to the plurality of locationally diverse audio devices;

after a caller initiates a call, receiving caller information regarding the call through a user telephone line of the plurality of user telephone lines;

transferring at least one control command from the central device to the audio device for reproducing onto the user telephone line at least one audio prompt from digital representations of the audio prompt stored in the audio device to prompt the caller to provide a destination number and speak a caller audio message;

receiving the destination number and the caller audio message from the caller in response to the reproduced audio prompt;

transferring at least one control command from the dental device to the audio device for converting the caller audio message into a digital representation of the caller audio message;

transferring at least one control command from the central device to the audio device for storing the digital representation in the audio device;

transferring at least one control from the central device to the audio device for calling the destination number to communicate with a message recipient; and transferring at least one control command from the central device to the audio device for reproducing to the message recipient the caller audio message from the digital representation of the caller audio message stored on the audio device.

6. Method of providing voice messaging services to callers from a wide area network system, the method comprising the steps of:

providing a plurality of locationally diverse audio devices connected to a plurality of user telephone lines and a central device connected to the plurality of locationally diverse audio devices;

after a caller initiates a call, receiving caller information at a first audio device regarding the call through a user telephone line of the plurality of user telephone lines;

reproducing onto the user telephone line at least one audio prompt from digital representations of the audio prompt stored in the first audio device to prompt the caller to provide a destination number and speak a caller audio message;

receiving the destination number and the caller audio message at the first audio device from the caller in response to the reproduced audio prompt;

converting the caller audio message into a digital representation of the caller audio message;

storing the digital representation in the first audio device;

evaluating at the central device, based on long distance rates, whether the digital representation of the caller audio message should be transferred to a second audio device nearer the location corresponding to the destination number;

calling the destination number to communicate with a message recipient; and reproducing to the message recipient the caller audio message from the digital representation of the caller audio message.

7. Method of claim 6, further including the step of, according to results of said evaluating step, commanding the first audio device to transfer the digital representation of the caller audio message to the second audio device.

8. An audio response system for providing voice signals through user communication channels to users at user telephones, said audio response system comprising:

an audio peripheral for connection to user telephones through user communication channels, said audio peripheral including, at least,
  a storage means for storing and retrieving storage representations of voice signals at peripheral voice storage addresses, and an interface interposed between said storage means and the user communication channels, said interface including, at least, storage-to-transmission means for converting the storage representations of voice signals into transmission representations of voice signals for transmission over the user communication channels; and a control device connected to said audio peripheral, said control device including, at least, command generation means for generating peripheral control commands for controlling said audio peripheral, said command generation means including, at least, address command generation means for generating peripheral control commands including peripheral voice storage address, wherein said audio peripheral is located remotely from said control device, and wherein said audio peripheral and said control device communicate through a public switched data network, and wherein said audio response system further comprises a conditioning means for converting communication signals between said audio peripheral and said control device for transmission on said public switched data network.

* * * * *